E. VIPOND.
MOTOR SLEIGH.
APPLICATION FILED MAR. 14, 1916.
1,202,338.
Patented Oct. 24, 1916.
3 SHEETS—SHEET 1.
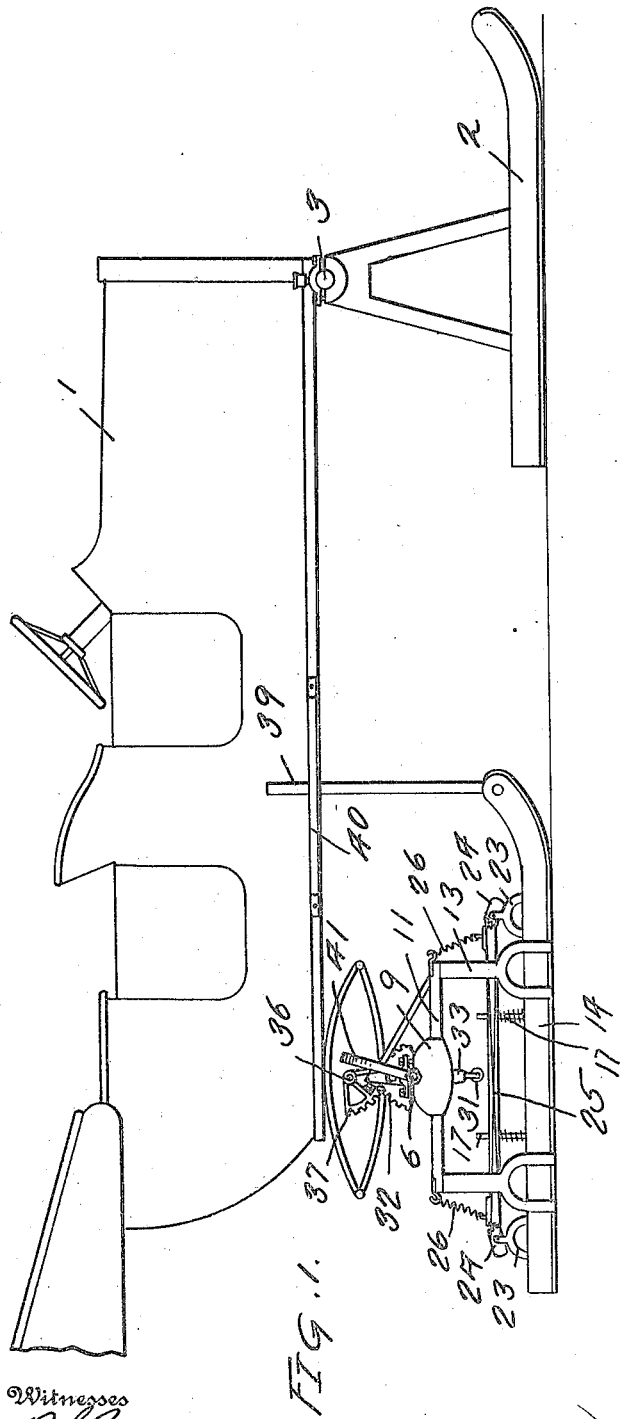
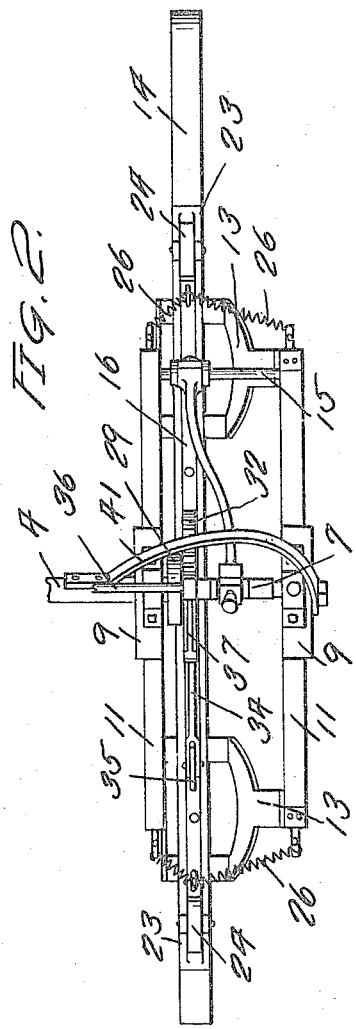
Witnesses
Inventor
E Vipond
By
Attorneys

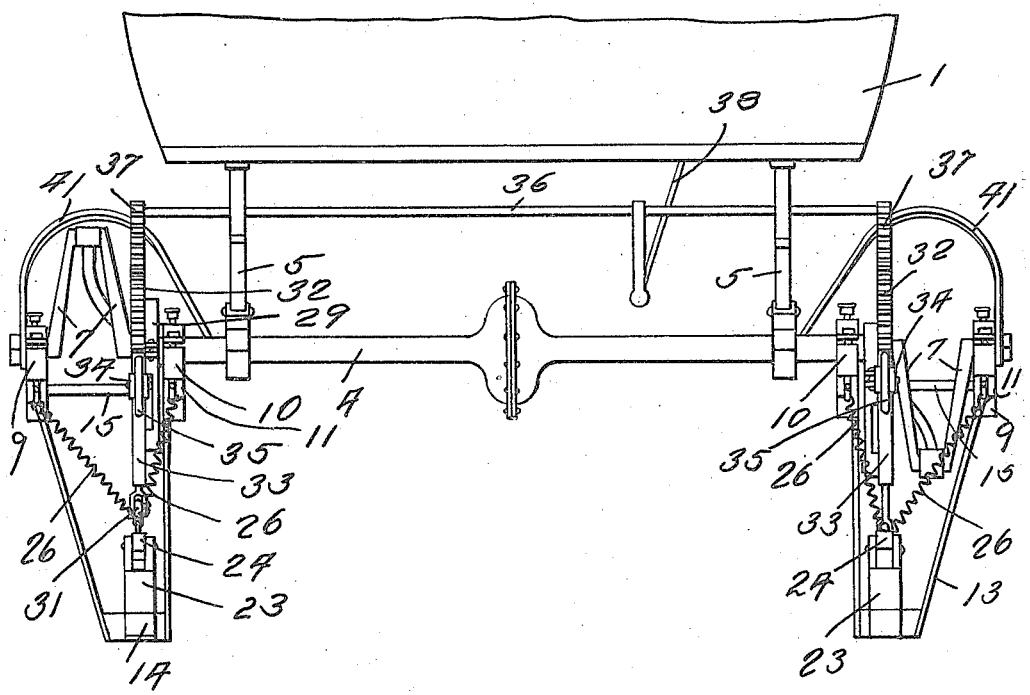
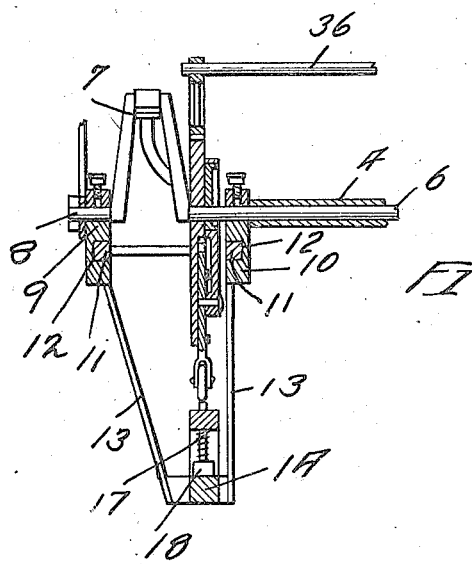

E. VIPOND.
MOTOR SLEIGH.
APPLICATION FILED MAR. 14, 1916.

1,202,338.

Patented Oct. 24, 1916.
3 SHEETS—SHEET 3.

Witnesses

Inventor
E. Vipond
By
Attorney

UNITED STATES PATENT OFFICE.

EDWARD VIPOND, OF KALKASKA, MICHIGAN.

MOTOR-SLEIGH.

1,202,338.          Specification of Letters Patent.          Patented Oct. 24, 1916.

Application filed March 14, 1916. Serial No. 84,161.

*To all whom it may concern:*

Be it known that I, EDWARD VIPOND, a citizen of the United States, residing at Kalkaska, in the county of Kalkaska, State of Michigan, have invented certain new and useful Improvements in Motor-Sleighs; and I do hereby declare the following to be a full, clear, and exact description of the invention, such as will enable others skilled in the art to which it appertains to make and use the same.

This invention relates to a motor sleigh.

An object of the invention resides in the provision of a sleigh which will be propelled by the alternate advance of the rear runners.

A further object of the invention resides in so constructing the device that, during the propulsion thereof there will be no possibility of the runners slipping.

With these and other objects in view, such as will appear as my description progresses, my invention comprises the combination and arrangement of parts as set forth in and falling within the scope of the appended claims.

Figure 5:
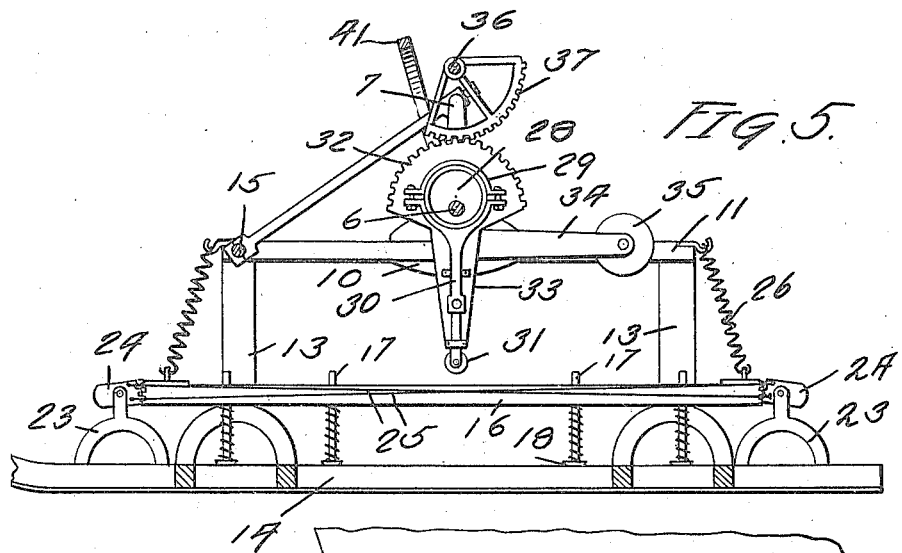
Figure 6:
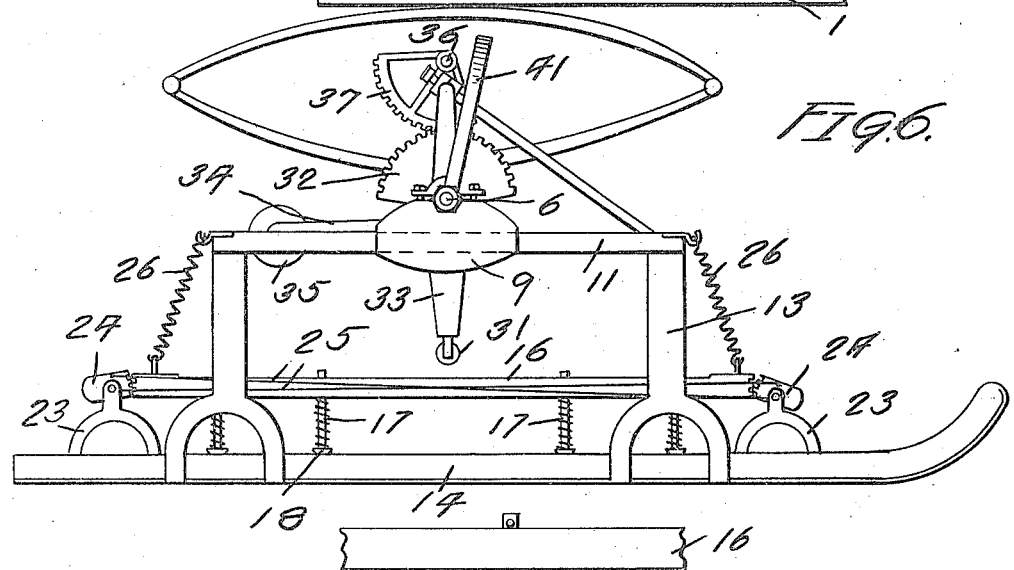
Figure 7:
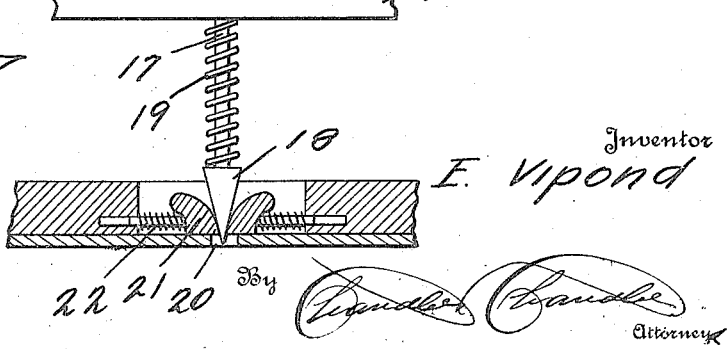

In the drawing: Figure 1 is a side elevation of a machine constructed in accordance with my invention; Fig. 2 is a plan view of one of the rear runners; Fig. 3 is a rear elevation of the machine; Fig. 4 is a transverse sectional view through one of the runners; Fig. 5 is a longitudinal sectional view therethrough; Fig. 6 is an enlarged side elevation of one of the runners, and Fig. 7 is a fragmental sectional view showing the manner in which the calks are mounted.

In the embodiment of my invention shown in the drawing, I have illustrated an automobile body 1 which is supported at its forward end by runners 2, the runners being mounted on the front axle 3. This body 1 is supported at its rear end on the rear axle casing 4 by means of springs 5. Extending through the casing 4 is an axle 6 which is provided at each end with a crank portion 7, the axle having an extension 8 projecting beyond each of these crank portions. Mounted on each extension 8 is a guide block 9 and mounted on the axle to the opposite side of each of the crank portions 7 is a similar guide block 10. These guide blocks are thus arranged in pairs on the opposite sides of the machine. Mounted on each pair of guide blocks is a frame which includes horizontal bars 11, which bars slide in slots 12 in the guide blocks. Depending from these horizontal bars 11 are braces 13 on the lower ends of which a runner 14 is mounted. It will thus be obvious that the runner may move forwardly and rearwardly, the bars 11 sliding through the blocks by which they are supported.

In order that these runners may be moved forwardly and rearwardly, I have provided connecting rods which extend from the crank portions 7 to the axle 6 and are connected to transversely extending rods 15, which rods extend between the forward ends of the horizontal bars 11. As the axle 6 rotates the crank portions 7 which are disposed oppositely will likewise rotate and inasmuch as these crank portions are connected to the runners 14 by the mechanism described, these runners will be moved forwardly and rearwardly, one moving forwardly as the other moves rearwardly, owing to the opposite disposition of the crank portions.

In order that the sleigh may be driven forwardly by the movement of the runners 14, I have provided a horizontally extending bar 16 above each of the runners 14. This bar carries a plurality of downwardly extending rods 17 which are provided with calks 18, which calks are normally pushed away from the bar by stiff coil springs 19 and which are adapted to extend through openings 20 in the runner. A pair of shoes 21 which are pressed into engagement with each of the calks 18 by means of coil springs 22 keeps the calks free from snow or ice during their operation. Located on brackets 23 at each end of each of the runners 14 are toothed plates 24 which intermesh with the toothed ends of the bar 16. Extending from one edge of one of the plates 24 to the opposite edge of the other plate is a rod or wire 25 and extending from the diagonally opposite edges is a second and similar rod or wire, the same being provided so that the plates 24 will move in unison and consequently all of the calks will be depressed at the same time and for the same distance. Each of the bars 16 is normally pulled upwardly by means of coiled springs 26 which are secured to the bar and to hooks 27 on the vertical braces 13.

In order that the bars 16 may be intermittently depressed during the rotation of the axle 6, I have secured, to each end of the axle, a cam 28 on which a cam strap 29 is mounted. Depending from this cam strap is an arm 30 having a roller 31 on the lower end thereof, which roller is adapted to contact with the adjacent bar 16. It will thus be seen that as the axle 6 is rotated the cams on the opposite ends of the axle 6 will be actuated and inasmuch as these cams are oppositely disposed one of the arms 30 will be depressed while the other one is drawn upwardly. This action of the arms will cause the calks on one side of the machine to be projected through the openings 20 in the adjacent runner.

Mounted on the axle 6 at each end thereof is a quadrant rack 32 which has a depending arm 33, on which arm the aforementioned arm 30 is slidably supported. This quadrant rack 32 is loosely mounted on the axle and is provided so that the arm 30 may be swung either forwardly or rearwardly to such position that upon the operation of its actuating cam it will be ineffective to move the bar 16. This arm 33 is provided with a second arm 34 having a roller 35 on the end thereof, the arm 34 extending at right angles to the arm 33. Thus when the quadrant rack 32 is moved in one direction the roller 31 will be moved clear of the bar 16 and consequently the machine will be allowed to coast with the calks 18 in their retracted position and when it is moved in the other direction the roller 31 will be moved clear of the bar 16 but the roller 35 will be moved into engagement therewith so that the calks 18 will be projected and act as a brake. In order that these arms 33 and 34 may be actuated, I have provided a transversely extending shaft 36 on each end of which is a rack 37, which racks intermesh with the racks 32 and actuate the latter when the shaft 36 is rotated. This shaft is actuated by a pedal-controlled rod 38, the pedal (not shown) being located within convenient reach of the operator.

The forward ends of the rear runners 14 are guided by rods 39 which are movable in guides 40 and the extended ends of the axle 6 are braced by suitable braces 41.

While I have illustrated the device constructed in a particular manner it has merely been for the sake of convenience and I do not wish to be limited to the particular embodiment shown as it is obvious that numerous changes may be made in the details of construction without departing from the spirit of the invention or exceeding the scope of the claims.

What I claim is:—

1. In a motor sleigh, the combination with a body, of a driving axle mounted thereon and having crank portions on the ends thereof, guide blocks mounted on the said axle, runners including horizontal bars slidably mounted in said guide blocks, vertical bars and runner members on the lower ends thereof and means for moving the runners alternately forwardly and rearwardly.

2. In a motor sleigh, the combination with a body, of a driving axle mounted thereon and having crank portions on the ends thereof, guide blocks mounted on the said axle, runners including horizontal bars slidably mounted in said guide blocks, vertical bars and runner members on the lower ends thereof, means for moving the runners alternately forwardly and rearwardly, movable calks mounted on said runner members and means for projecting said calks from the runner members when the latter are moving in one direction.

3. In a sleigh, the combination with a body, of a driving axle mounted thereon, runners mounted on the rear axle and slidable forwardly and rearwardly thereof, means for moving the runners alternately, calks on the runners, means for projecting the calks from the runners intermittently and means for projecting the calks continuously.

In testimony whereof, I affix my signature, in the presence of two witnesses.

EDWARD VIPOND.

Witnesses:
NATHAN O'DELL,
JOHN ROSS.

Copies of this patent may be obtained for five cents each, by addressing the "Commissioner of Patents, Washington, D. C."